(12) United States Patent
Takahashi

(10) Patent No.: US 8,289,204 B2
(45) Date of Patent: Oct. 16, 2012

(54) MOBILE COMMUNICATION TERMINAL AND GPS POSITIONING METHOD

(75) Inventor: Makoto Takahashi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 230 days.

(21) Appl. No.: 12/780,448

(22) Filed: May 14, 2010

(65) Prior Publication Data
US 2010/0289694 A1 Nov. 18, 2010

(30) Foreign Application Priority Data

May 18, 2009 (JP) ................................ P2009-120057

(51) Int. Cl.
*G01S 19/06* (2010.01)
*G01S 19/25* (2010.01)
(52) U.S. Cl. ................................ 342/357.43; 342/357.64
(58) Field of Classification Search ............. 342/357.42, 342/357.43, 357.4, 357.64; 701/468
See application file for complete search history.

(56) References Cited

U.S. PATENT DOCUMENTS

| | | | |
|---|---|---|---|
| 2007/0132639 | A1 | 6/2007 | Korneluk et al. |
| 2007/0139264 | A1 | 6/2007 | Kangas |
| 2008/0048910 | A1 | 2/2008 | Wang et al. |

FOREIGN PATENT DOCUMENTS

| | | |
|---|---|---|
| CN | 1918482 A | 2/2007 |
| JP | 2002-221563 | 8/2002 |
| JP | 3575451 | 10/2004 |
| JP | 2005-321345 | 11/2005 |
| JP | 3785968 | 6/2006 |
| JP | 4194910 | 12/2008 |
| JP | 4312233 | 8/2009 |
| WO | WO 2009/050671 A1 | 4/2009 |

OTHER PUBLICATIONS

Extended European Search Report issued Sep. 21, 2010 in Application No. 10163106.7-2220.
M. D. Karunanayake, et al., "Analysis of assistance data on AGPS performance", Measurement Science and Technology, vol. 18, No. 7, XP20118698, Jul. 1, 2007, pp. 1908-1916.
European Office Action issued May 26, 2011, in Patent Application No. 10 163 106.7.
Chinese Office Action issued Mar. 19, 2012, in Patent Application No. 201010182953.6 (with English-language translation).

*Primary Examiner* — Dao Phan
(74) *Attorney, Agent, or Firm* — Oblon, Spivak, McClelland, Maier & Neustadt, L.L.P.

(57) ABSTRACT

An object is to enhance certainty of a positioning process in a mobile communication terminal even with a large error of approximate location information. A mobile communication terminal 1 is a mobile communication terminal for performing GPS positioning using GPS positioning assist data and signals received from GPS satellites. The mobile communication terminal 1 has an assist data requesting unit 13 which receives as the GPS positioning assist data, approximate location information of the mobile communication terminal 1 and error information indicative of an error of the approximate location information, a GPS positioning unit 11 which performs the GPS positioning, a positioning result determining unit 14 which determines whether the error information used in the GPS positioning is not less than a threshold $TH_M$, with a failure in the GPS positioning, and an input accepting unit 15 which accepts input of approximate location information when the error information is not less than the threshold $TH_M$. The GPS positioning unit 11 again performs positioning using the approximate location information accepted by the input accepting unit 15.

9 Claims, 8 Drawing Sheets

Fig. 3

| Region name | Country name | City name candidate | Location coordinates | Location error |
|---|---|---|---|---|
| .... | .... | .... | .... | .... |
| North America | USA | Washington D.C. | (X1,Y1,...) | Akm |
| | | New York | (X2,Y2,...) | Bkm |
| | | Los Angels | (X3,Y3,...) | Ckm |
| | | Chicago | (X4,Y4,...) | Dkm |
| | | Houston | (X5,Y5,...) | Ekm |
| | Alaska | — | — | — |
| | Canada | — | — | — |
| .... | .... | .... | .... | .... |

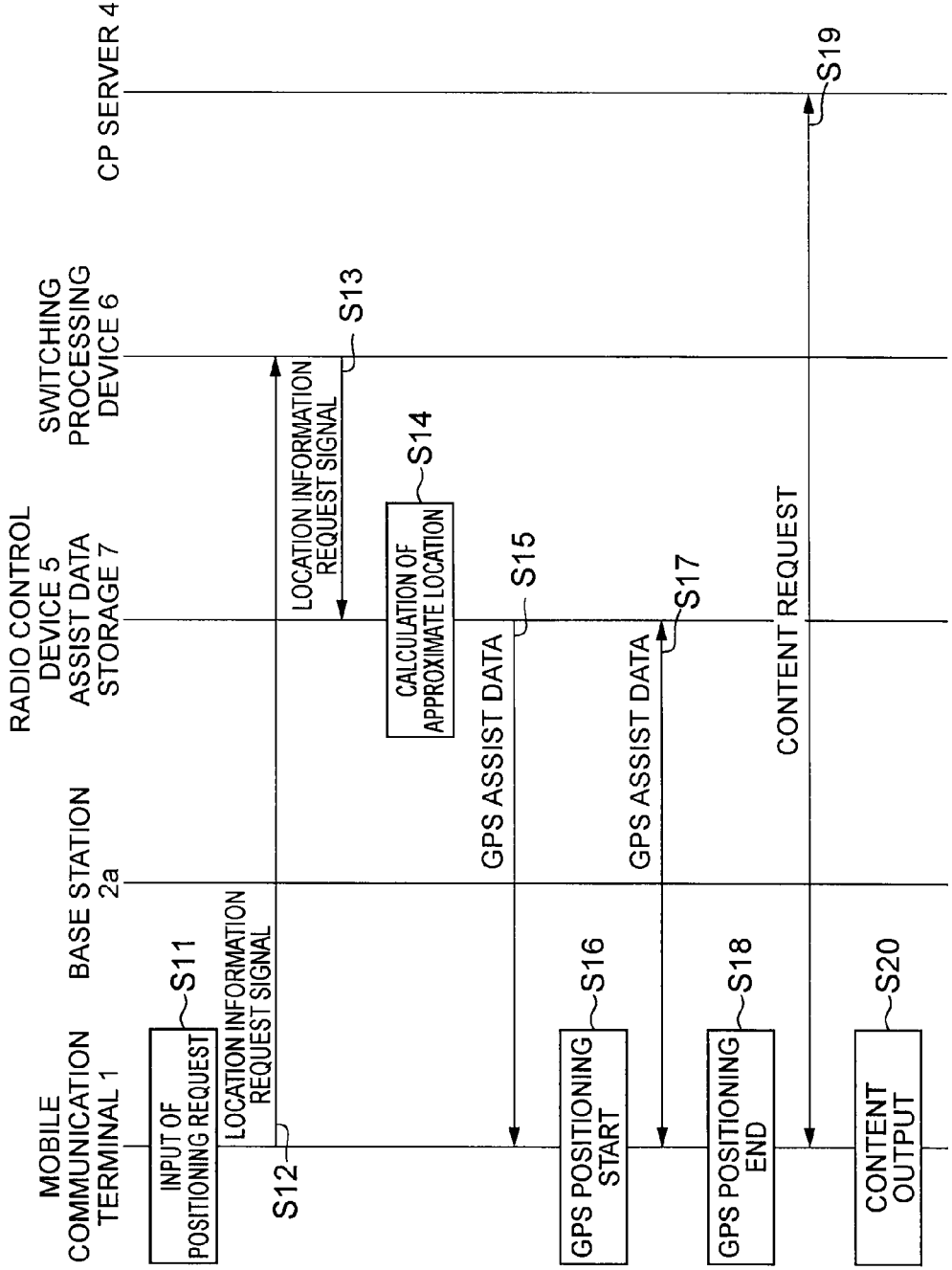

MOBILE COMMUNICATION TERMINAL AND GPS POSITIONING METHOD

BACKGROUND OF THE INVENTION

1. Field of the Invention

The present invention relates to a mobile communication terminal and a GPS positioning method.

2. Related Background Art

The positioning technology using signals from GPS (Global Positioning System) satellites has been commonly used heretofore. For example, Patent Document 1 below discloses the positioning technology using GPS positioning assist information including the satellite orbit information (ephemeris) and others sent from a GPS assist server.
Patent Document 1: Japanese Patent Application Laid-open No. 2002-221563

SUMMARY OF THE INVENTION

The foregoing GPS positioning assist information can contain approximate location information indicative of an approximate location of a positioning object and error information indicative of an error of the location, and use of these pieces of information facilitates the positioning process using the signals from the GPS satellites. However, if the error of the approximate location information was large in the positioning using the approximate location information, it was sometimes the case that the positioning process was not normally performed depending upon intensities of radio waves from the GPS satellites.

The present invention has been accomplished in view of the above problem and it is an object of the present invention to provide a mobile communication terminal and a GPS positioning method capable of enhancing the certainty of the positioning process even with a large error of the approximate location information.

In order to solve the above problem, a mobile communication terminal according to the present invention is a mobile communication terminal for receiving positioning assist information and performing GPS positioning using the positioning assist information and signals received from GPS satellites, comprising: assist information receiving means which receives as the positioning assist information, approximate location information indicative of an approximate location of the mobile communication terminal and error information indicative of an error of the location indicated by the approximate location information; positioning means which performs the GPS positioning using the positioning assist information; determining means which determines whether the error information corresponding to the approximate location information used in the GPS positioning is not less than a predetermined value, with a failure in the GPS positioning; and input means which accepts input of the approximate location information when the determining means determines that the error information is not less than the predetermined value, wherein the positioning means again performs positioning using the approximate location information accepted by the input means.

As another aspect of the present invention, a GPS positioning method according to the present invention is a GPS positioning method for receiving positioning assist information and performing GPS positioning using the positioning assist information and signals received from GPS satellites, comprising: an assist information receiving step wherein a mobile communication terminal receives as the positioning assist information, approximate location information indicative of an approximate location of the mobile communication terminal and error information indicative of an error of the location indicated by the approximate location information; a positioning step wherein the mobile communication terminal performs the GPS positioning using the positioning assist information; a determining step wherein the mobile communication terminal determines whether the error information corresponding to the approximate location information used in the GPS positioning is not less than a predetermined value, with a failure in the GPS positioning; and an input step wherein the mobile communication terminal accepts input of the approximate location information when it is determined in the determining step that the error information is not less than the predetermined value, wherein the positioning step comprises again performing positioning using the approximate location information accepted in the input step.

According to these mobile communication terminal and GPS positioning method, the positioning assist information to be received is the approximate location information indicative of the approximate location and the error information indicative of the error of the location and the GPS positioning is performed using those pieces of information. With a failure in the positioning process, when the error information is not less than the predetermined value, input of the approximate location information is accepted and positioning is again performed using the accepted approximate location information. This permits the positioning process to be certainly performed by reentry of the approximate location information to refine the target range even if the positioning results in a failure because of the large error of the approximate location information received from the outside and weak intensities of signals from GPS satellites.

The mobile communication terminal is preferably configured as follows: with the failure in the GPS positioning, when the error information is not more than a predetermined value, the determining means performs a control to output the approximate location information as a positioning result.

In this case, if the GPS positioning results in a failure in spite of a small error of the approximate location information acquired from the outside, the efficient positioning result can be obtained by using the approximate location information as the positioning result.

The mobile communication terminal is also preferably configured as follows: it further comprises candidate information storing means which stores correspondence between location candidate information indicative of candidates for the approximate location information and error information indicative of errors of locations indicated by the location candidate information, the input means accepts selection of one from the location candidate information stored in the candidate information storing means, and the positioning means again performs the positioning, using the location candidate information of the selected one accepted by the input means, and the error information corresponding to the location candidate information.

As described above, the present invention allows the terminal to smoothly perform refinement of the approximate location information and input of the error information corresponding to the refinement.

BRIEF DESCRIPTION OF THE DRAWINGS

FIG. 3 is a drawing showing a data configuration of location candidate information stored in a candidate information storing unit 16 shown in FIG. 1.

FIG. 8 is a sequence diagram showing an operation during the positioning process of the mobile communication terminal shown in FIG. 7.

DESCRIPTION OF THE PREFERRED EMBODIMENTS

The preferred embodiments of the mobile communication terminal and the GPS positioning method according to the present invention will be described below in detail with the drawings. In the description of the drawings the same elements will be denoted by the same reference symbols, without redundant description.

Figure 1:
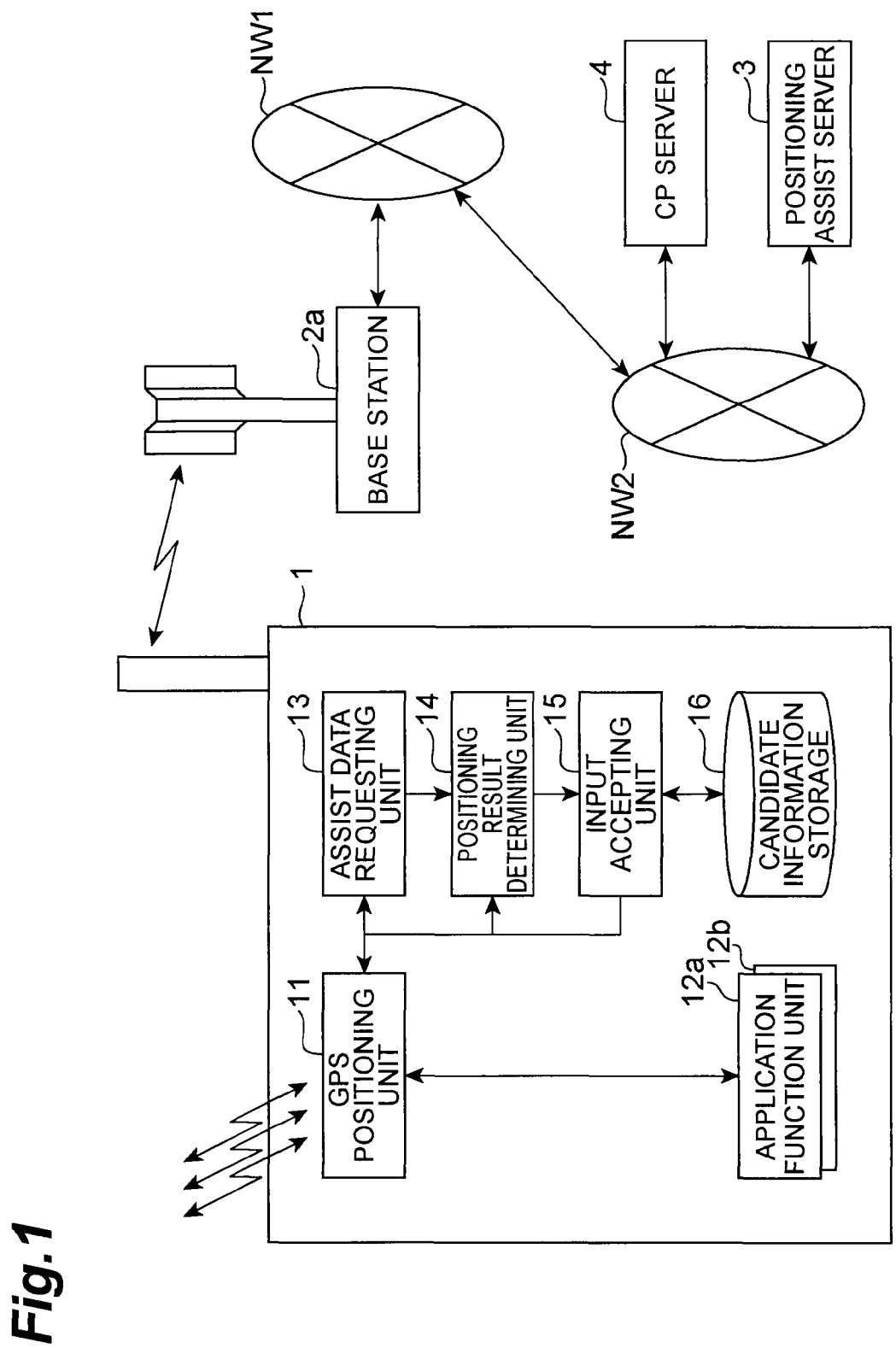
FIG. 1 is a schematic configuration diagram showing a mobile communication terminal which is a preferred embodiment of the present invention.

FIG. 1 is a schematic configuration diagram showing a mobile communication terminal 1 which is a preferred embodiment of the present invention. The mobile communication terminal 1 shown in the same drawing is a communication terminal such as a cell phone or a PDA (Personal Digital Assistance) having a data communication function and a voice communication function according to a mobile communication system such as IMT (International Mobile Telecommunications) 2000, and having a GPS positioning function using signals received from the GPS satellites.

As shown in the same drawing, the mobile communication terminal 1 is configured to be able to be connected to a communication network NW1 which is a network visited by the mobile communication terminal 1 in a roaming service through a base station 2a. The visited communication network NW1 is connected to a communication network NW2 which is a network provided by a telecommunications carrier directly providing a communication service to the mobile communication terminal 1, and the mobile communication terminal 1 can be connected to the communication network NW2 via the communication network NW1. This connection configuration permits the mobile communication terminal 1 to be wirelessly connected to the communication network NW1 as the visited network by roaming, and thereby to perform packet data communication and voice communication with various terminal devices and server devices connected to the communication network NW2. Furthermore, a positioning assist server 3 for providing GPS positioning assist data to the mobile communication terminal 1 and a CP server 4 for storing contents to be provided to the mobile communication terminal 1 are connected to the communication network NW2, so that the mobile communication terminal 1 can transmit and receive packet data to and from the positioning assist server 3 and the CP server 4.

The below will detail the hardware configuration and functional configuration of the mobile communication terminal 1.

Figure 2:
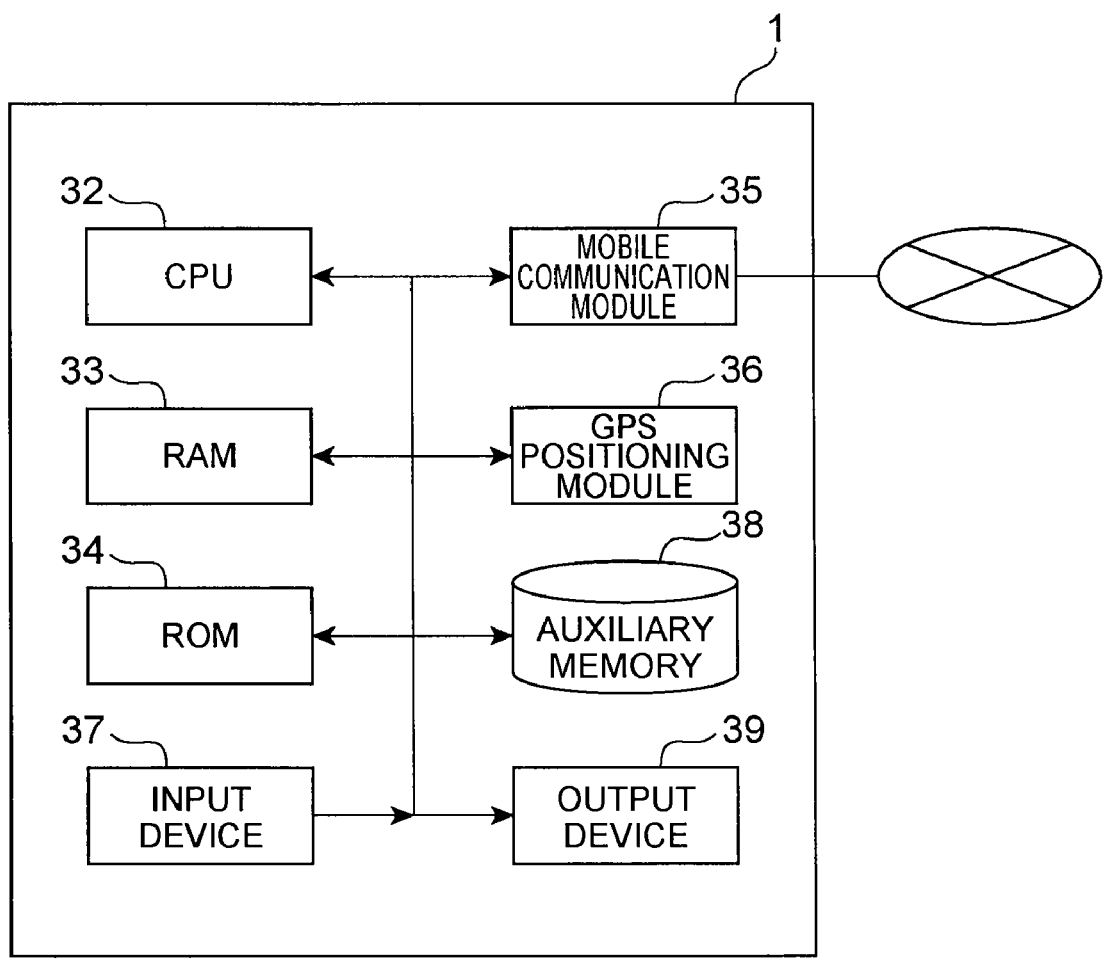
FIG. 2 is a block diagram showing a hardware configuration of the mobile communication terminal shown in FIG. 1.

As shown in FIG. 2, the mobile communication terminal 1 is configured, physically, as an information processing device including a CPU 32, RAM 33 and ROM 34 as primary storage devices, an auxiliary storage device 38 such as a hard disk drive, an input unit 37 such as input keys or a mouse as an input device, an output device 39 such as a display or a speaker, a mobile communication module 35 to perform transmission and reception of data to and from other terminal devices, server devices, and facilities in the communication network NW2, and a GPS positioning module 36 to receive signals from GPS satellites and to perform the GPS positioning. The functions achieved by the mobile communication terminal 1 are implemented by making a predetermined program loaded onto hardware such as the CPU 32 and RAM 33 shown in FIG. 2, letting the mobile communication module 35, GPS positioning module 36, input device 37, and output device 39 operate under control of the CPU 32, and performing readout and writing of data from and into the RAM 33 and/or the auxiliary storage device 38.

Referring back to FIG. 1, the mobile communication terminal 1 has functional components of a GPS positioning unit (positioning means) 11, application function units 12a and 12b, an assist data requesting unit (assist information receiving means) 13, a positioning result determining unit (determining means) 14, an input accepting unit (input means) 15, and a candidate information storing unit (candidate information storing means) 16.

Each of the application function units 12a and 12b has a function for providing an information providing service using location information of the mobile communication terminal 1 calculated by the GPS positioning unit 11, to a user of the mobile communication terminal 1 or to a user of another terminal. For example, the application function units 12a and 12b have a function to acquire from the CP server 4, map information, store information, etc. corresponding to the location information, and to display the information or to transmit an emergency information notice using the location information.

With a request for the location information from the application function unit 12a or 12b, the assist data requesting unit 13 sends a request signal of GPS positioning assist data to the communication networks NW1, NW2 and acquires the GPS positioning assist data in accordance therewith. This GPS positioning assist data contains the GPS satellite orbit information (ephemeris), and reference location information including approximate location information indicative of an approximate location of the mobile communication terminal 1 predicted in advance, and error information indicative of an error of the approximate location. The approximate location information contained in this reference location information includes information elements such as "Latitude sign," "Degrees Of Latitude," "Degrees Of Longitude," "Altitude Direction," and "Altitude," and the error information includes information elements such as "Uncertainty semi-major," "Uncertainty semi-minor," "Orientation of major axis," "Uncertainty Altitude," and "Confidence." Then the assist data requesting unit 13 transfers the acquired GPS positioning assist data to the GPS positioning unit 11.

In response to the positioning request from the application function unit 12a or 12b, the GPS positioning unit 11 performs the GPS positioning process in order to acquire the location information about the current location of the mobile communication terminal 1. On that occasion, the GPS positioning unit 11 executes the positioning process by receiving signals from GPS satellites, using the GPS positioning assist data transferred from the assist data requesting unit 13. The GPS positioning unit 11 returns the location information about the mobile communication terminal 1 generated as a result of the positioning process, to the application function unit 12a or 12b, and sends positioning result information indicative of whether the positioning is normally completed, the approximate location information used in the positioning process, and the error information to the positioning result determining unit 14. Namely, when the location information is not normally acquired, for example, because of a failure in capture of signals from the GPS satellites, the GPS positioning unit 11 sends the positioning result information indicating an abnormal end of the positioning process.

Specifically, the GPS positioning unit 11 switches the method of positioning operation between two methods in accordance with the error information contained in the GPS positioning assist data. Namely, if the error from the location indicated by the approximate location information is not more than a predetermined value (e.g., 150 km), the GPS positioning unit 11 measures a time of reception of each ranging code, which is Pseudo Random Noise (PRN) modulated on a carrier wave of a GPS signal, to acquire an arrival time of the signal from the GPS satellite, thereby calculating a pseudo range from the GPS satellite. When the location error is not more than the predetermined value, as described above, an occurrence time of the signal at each GPS satellite can be known by simply achieving synchronization with the ranging code repeated in a predetermined cycle (e.g., 1 msec) and the pseudo range can be obtained using the occurrence time. Then the GPS positioning unit 11 calculates the location of the mobile communication terminal 1 from the pseudo ranges of a plurality of GPS satellites (which will be called a first positioning method). For example, the GPS positioning unit 11 obtains the positioning result of the mobile communication terminal 1 by calculating the distance to each GPS satellite by replacing a measured value with a value of not more than one cycle (e.g., 300 km) of the ranging code on the occasion of obtaining the pseudo range using the approximate location information.

On the other hand, when the location error of the approximate location information is over the predetermined value (e.g., 150 km), the GPS positioning unit 11 cannot obtain the pseudo range by the ranging code and then calculates the pseudo range from each GPS satellite by demodulating a navigation message digitally modulated on a carrier wave of a GPS signal and referring to a GPS system time (Zcount) indicative of an occurrence time of the GPS signal included in this navigation message. In this case, the GPS positioning unit 11 needs to perform the demodulation process of the GPS signals and, in order to normally calculate the location of the mobile communication terminal 1, it is necessary to receive the signals from the GPS satellites with strong electric fields and to demodulate the signals from at least four GPS satellites. Then the GPS positioning unit 11 calculates the location of the mobile communication terminal 1, using the determined pseudo ranges to four GPS satellites (which will be called a second positioning method).

When the positioning result information sent from the GPS positioning unit 11 indicates a failure in the positioning process, the positioning result determining unit 14 determines whether the error information used in the positioning process is not less than a predetermined value. When the result of the determination is that the error information is not less than the threshold $TH_M$ (e.g., $TH_M$=150 km), the positioning result determining unit 14 instructs the input accepting unit 15 to accept input of approximate location information, in order to perform the positioning process again. This threshold $TH_M$ is used as a reference value for determining whether the GPS positioning unit 11 adopts the first positioning method using the ranging codes. On the other hand, if the error information is less than the threshold $TH_M$ and not less than a threshold $TH_L$ (e.g., $TH_L$=50 m), the positioning result determining unit 14 outputs the positioning result indicative of a failure in the positioning process to the output device 39. Furthermore, if the error information is less than the threshold $TH_L$, the positioning result determining unit 14 outputs the approximate location information itself used in the positioning process by the GPS positioning unit 11, as the location information about the mobile communication terminal 1 to the application function unit 12a or 12b. In this case, the application function unit 12a or 12b is controlled so as to output the approximate location information used in the positioning, as the positioning result of the mobile communication terminal 1.

When instructed to accept input of the approximate location information, by the positioning result determining unit 14, the input accepting unit 15 accepts selective input of approximate location information and error information corresponding thereto from the user of the mobile communication terminal 1. Specifically, the input accepting unit 15 makes the output device 39 display information of a plurality of location candidates preliminarily stored in the candidate information storing unit 16, thereby to accept user's selective input out of the information of those location candidates.

FIG. 3 is a drawing showing a data configuration of the location candidate information stored in the candidate information storing unit 16. As shown in the same drawing, the candidate information storing unit 16 stores city name candidate "Washington D.C." indicative of a candidate for the approximate location information used as the GPS positioning assist data, in correspondence to location coordinates "(X1, Y1, . . . )" indicative of the location of the city name candidate and a location error "Akm" indicative of an error between the location candidate and the true location of the mobile communication terminal 1. Furthermore, a region name "North America" and a country name "U.S.A." indicative of a regional section of the city name candidate are stored in hierarchical correspondence to the city name candidate "Washington D.C."

Figure 4:
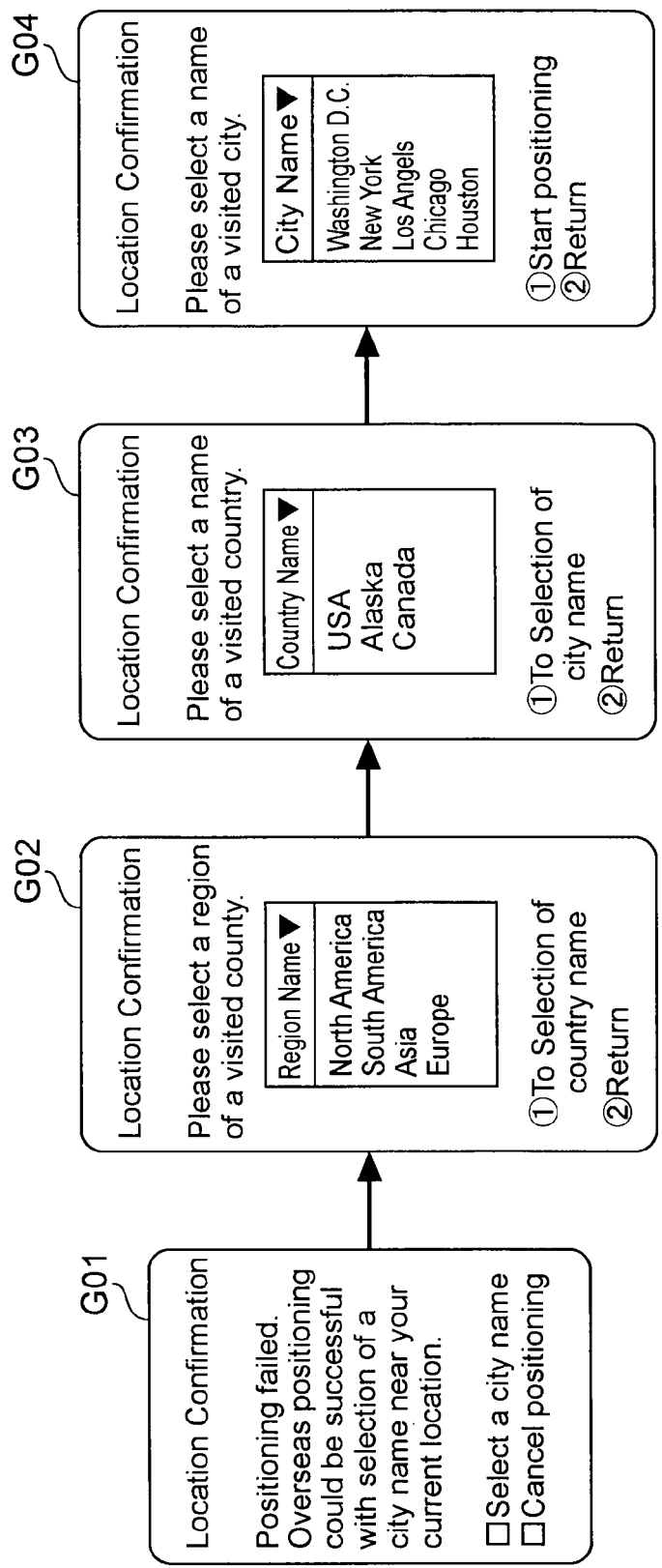
FIG. 4 is a drawing showing screen images output by control of an input accepting unit shown in FIG. 1.

With reference to such location candidate information, the input accepting unit 15 controls the output device 39 so as to achieve screen transitions in the order as shown in FIG. 4, to accept selection of approximate location information. Specifically, the input accepting unit 15 makes the output device output a message indicative of a failure in the positioning like output screen G01 upon the failure in the GPS positioning, and then makes the output device sequentially display output screens G02, G03, and G04 for selection of the approximate location information from the location candidate information stored in the candidate information storing unit 16. The output screen G02 refines the region name corresponding to the location candidate information, the output screen G03 further refines the country name corresponding to the region name, and the output screen G04 makes a specific city name corresponding to the country name selected as the approximate location information. Then the input accepting unit 15 transfers the location coordinates and location error stored in correspondence to the selected city name, as the approximate location information and error information corresponding thereto, to the GPS positioning unit 11. In accordance therewith, the GPS positioning unit 11 again performs the GPS positioning, using the location coordinates and location error as the reference location information of the GPS positioning assist data.

Figure 5:
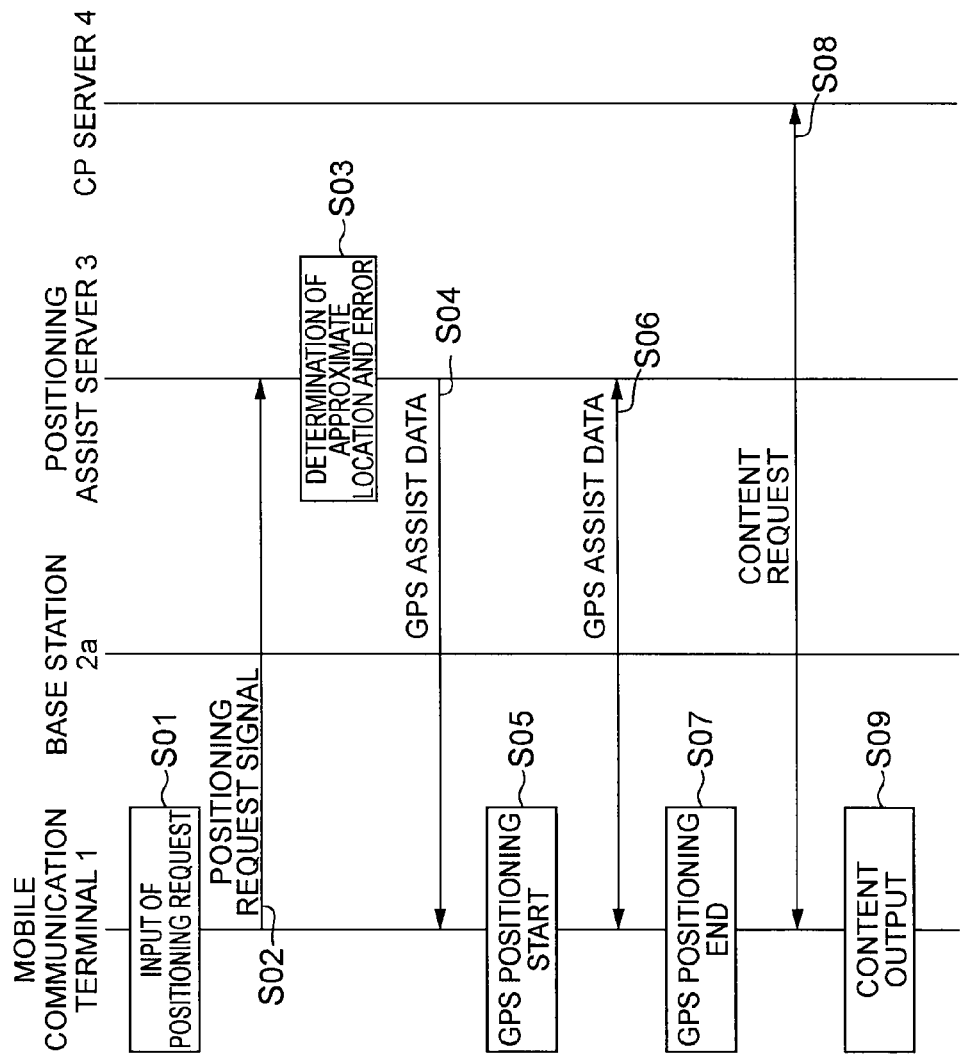
FIG. 5 is a sequence diagram showing an operation during a positioning process of the mobile communication terminal shown in FIG. 1.
Figure 6:
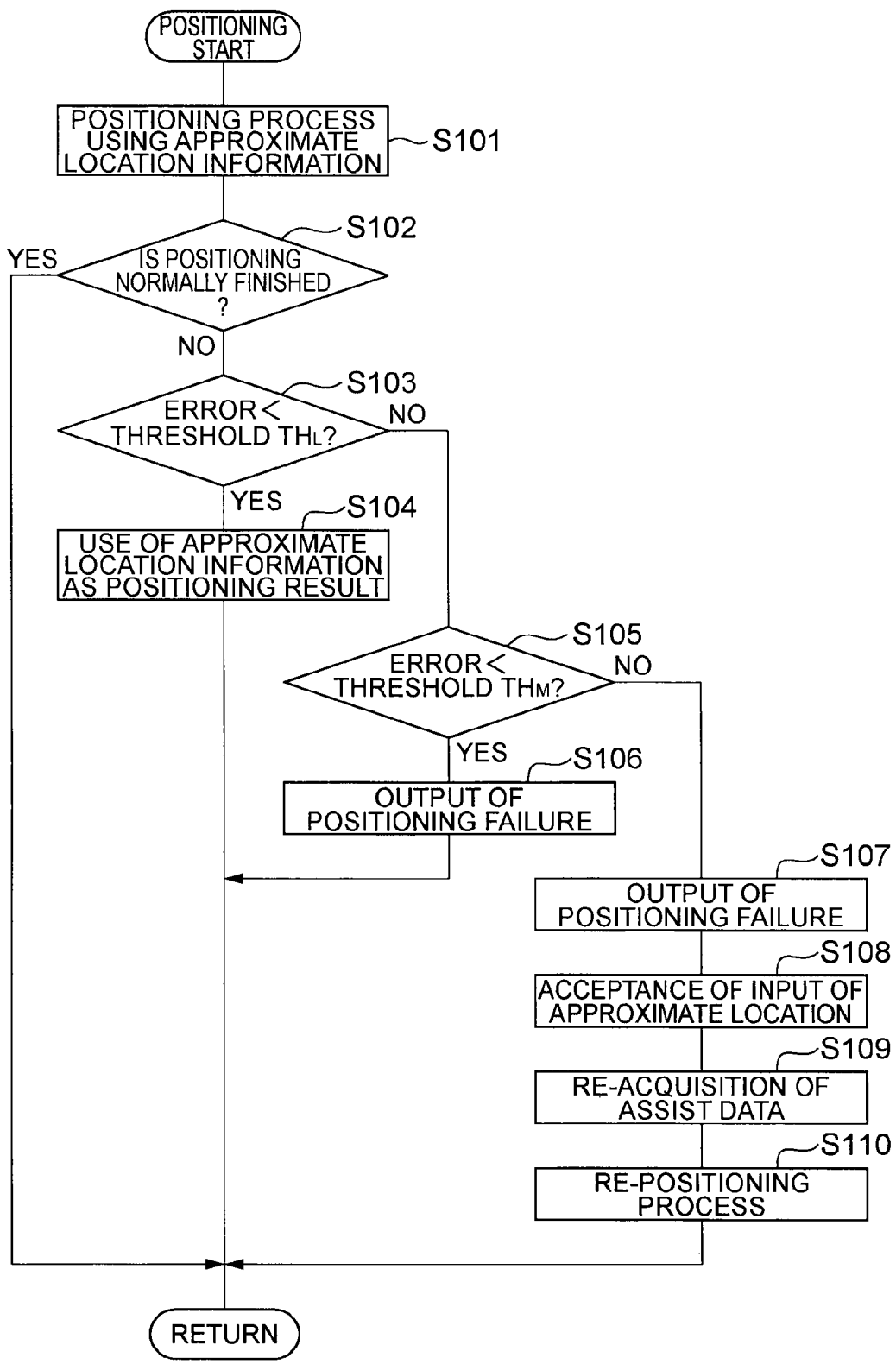
FIG. 6 is a flowchart showing the details of the GPS positioning process of the mobile communication terminal shown in FIG. 5.

The following will describe the positioning operation of the mobile communication terminal 1 in a roaming connection, while detailing the GPS positioning method in the mobile communication terminal 1, with reference to FIGS. 5 and 6. FIG. 5 is a sequence diagram showing the operation in the positioning process of the mobile communication terminal 1 and FIG. 6 a flowchart showing the details of the GPS positioning process of the mobile communication terminal 1.

First, in the mobile communication terminal 1, a positioning request is accepted, e.g., an acquisition request of a content using the application function unit 12a or 12b (step S01). The trigger of the positioning start is not limited to a request from the user of the mobile communication terminal 1, but may be a request from another terminal device or the like, automatic activation by the application function unit 12a or 12b, and so on. In accordance with this positioning request, the assist data requesting unit 13 of the mobile communication terminal 1 transmits a positioning request signal via the communication networks NW1, NW2 to the positioning assist server 3 (step S02).

In response thereto, the positioning assist server 3 extracts identification information such as communication carrier identification information and region identification number for identifying a visited network of the mobile communication terminal 1 in roaming included in the positioning request signal and determines the approximate location information indicative of an approximate location of the mobile communication terminal 1 and error information indicative of an error of the approximate location information on the basis of the identification information (step S03). For example, if the region of the visited network is "U.S.A.," it can be contemplated that a center position of the region is set as the approximate location information and an error corresponding to a range covering the entire region is set as the error information.

Next, the pieces of approximate location information and error information thus determined are attached to the GPS positioning assist data including the other information such as the satellite orbit information, and the positioning assist server 3 returns the information to the assist data requesting unit 13 of the mobile communication terminal 1 (step S04). Thereafter, the GPS positioning unit 11 of the mobile communication terminal 1 performs the GPS positioning process to acquire more accurate location information of the mobile communication terminal (steps S05 to S07). If the positioning process results in a failure, the mobile communication terminal 1 repeats the processes of steps S02 to S04 according to the error information to acquire the GPS positioning assist data (step S06) and repeats the positioning process (step S07). Furthermore, the application function unit 12a, 12b of the mobile communication terminal 1 transmits a content request signal to request a corresponding content such as map information, to the CP server 4, based on the acquired location information, and the corresponding content is received (step S08). As a result, the application function unit 12a or 12b outputs the corresponding content in a predetermined output format by a map image, characters, sound, and the like to the output device 39 (step S09).

The below will describe the detailed procedure of the GPS positioning process of the mobile communication terminal 1 (steps S05 to S07 in FIG. 5), with reference to FIG. 6.

With a start of the positioning, the GPS positioning unit 11 performs the positioning process by adopting either the first positioning method or the second positioning method, using the approximate location information and the error information (step S101). Thereafter, the positioning result determining unit 14 determines whether the GPS positioning process is normally completed (step S102). When the result of the determination is that the GPS positioning process is normally completed (step S102; YES), the positioning processing is terminated.

On the other hand, when the positioning result determining unit 14 determines that the positioning process is abnormally finished (step S102; NO), it further determines whether the error distance indicated by the error information used in the positioning process is less than the predetermined threshold $TH_L$ (step S103). When the result of the determination is that the error distance is less than the threshold $TH_L$ (step S103; YES), the location indicated by the approximate location information is defined as the positioning result of the mobile communication terminal 1 and the positioning process is terminated (step S104). In this case, the process by the first positioning method results in a failure, but the accuracy of the approximate location information previously obtained as the GPS positioning assist data is high enough and thus the information is used as a substitute positioning result.

If the error distance is not less than the threshold $TH_L$ on the contrary (step S103; NO), it is further determined whether the error distance is less than the predetermined threshold $TH_M$ (step S105). When the result of the determination is that the error distance is less than the threshold $TH_M$ (step S105; YES), the positioning result determining unit 14 outputs the positioning result indicative of an abnormal end of the positioning process to the output device 39 and thereafter the positioning process is terminated (step S106). Namely, in this case, the procedure is terminated on the assumption of the failure in the positioning process because the process by the first positioning method results in a failure and the accuracy of the approximate location information is not high enough to be used as the positioning result of the mobile communication terminal 1.

On the other hand, when the error distance is not less than the threshold $TH_M$ (step S 105; NO), the input accepting unit 15 outputs the positioning result indicative of an abnormal end of the positioning process to the output device 39 (step S107). In this case, since the process by the second positioning method resulted in a failure, the mobile communication terminal is controlled so as to again execute the process by the first positioning method. Namely, the input accepting unit 15 accepts selective input for selection of approximate location information, out of the location candidate information stored in the candidate information storing unit 16 (step S108 and FIG. 4). Then the input accepting unit 15 generates the approximate location information and error information corresponding to the location candidate information selected by the user, and transfers the approximate location information and error information as reference location information to the GPS positioning unit 11. Thereafter, the assist data requesting unit 13 acquires the GPS positioning assist data according to the procedure similar to steps S02 to S04 in FIG. 5 (step S109). Then the GPS positioning unit 11 again performs the positioning process using the approximate location information and error information generated by the input accepting unit 15, and the GPS positioning assist data except for the approximate location information and error information in the data acquired in step S109, and the positioning process is terminated (step S110).

The aforementioned GPS positioning method is based on the assumption that the mobile communication terminal 1 is wirelessly connected to the communication network NW1 of the visited network in a roaming service abroad or the like, whereas the below will describe a connection configuration and a GPS positioning method in a case where the mobile communication terminal 1 is connected directly to a communication network of a telecommunications carrier providing a communication service to the mobile communication terminal 1.

Figure 7:
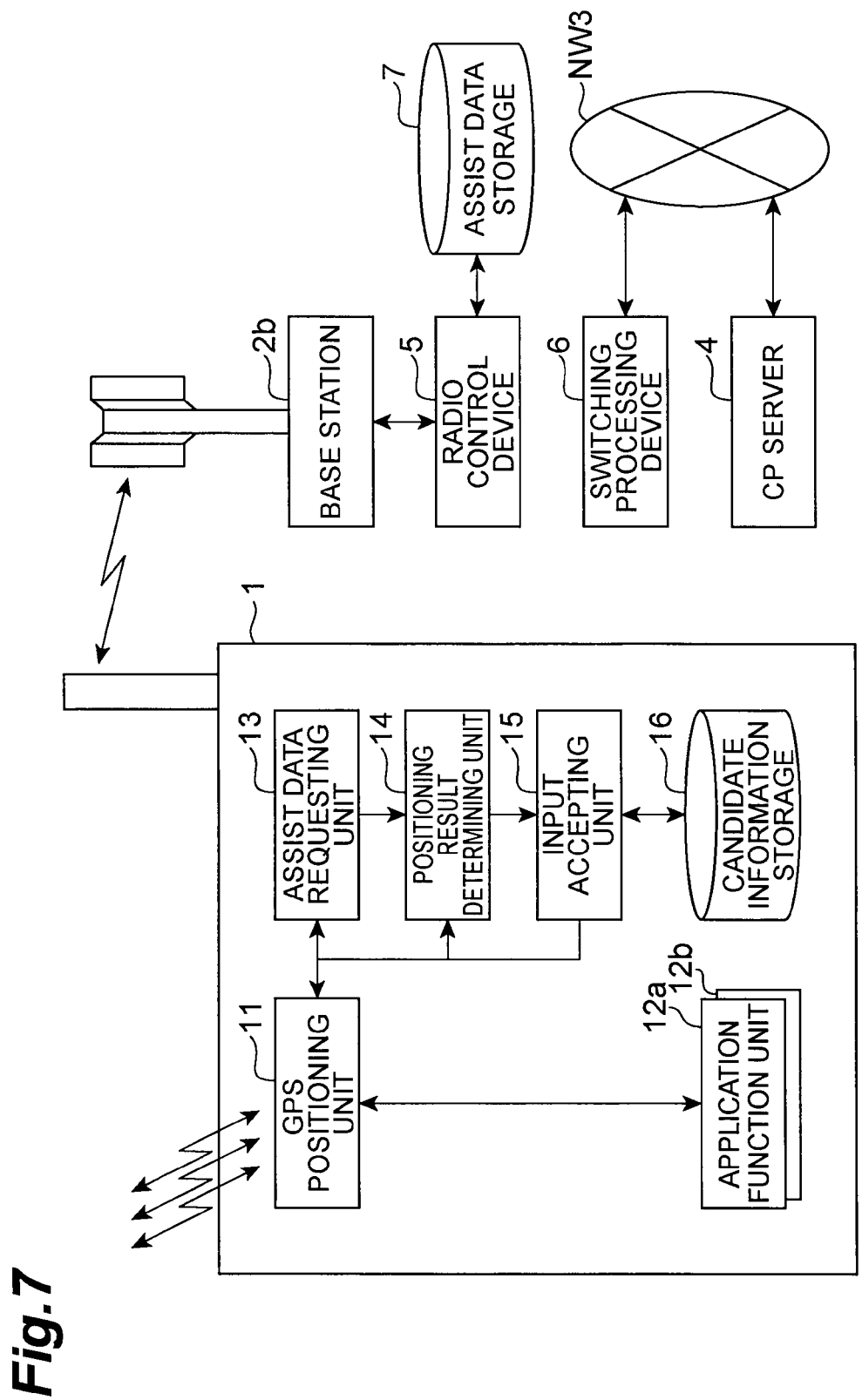
FIG. 7 is a schematic configuration diagram showing another connection form of the mobile communication terminal shown in FIG. 1.

FIG. 7 is a schematic configuration diagram showing a connection form between the mobile communication terminal 1 and the communication network in this case. As shown in the same drawing, the mobile communication terminal 1 is connected via a base station 2b, a radio control device 5, a switching processing device 6, etc. to the communication network NW3. This radio control device 5 is a device that controls wireless connection to the mobile communication terminal 1, and the switching processing device 6 is a device that controls the circuit switching process and the packet switching process with the mobile communication terminal 1. Furthermore, an assist data storage device 7 for storing the GPS positioning assist data to be provided to the mobile communication terminal 1 is connected to the radio control device 5 and the assist data storage device 7 is provided with a function to receive GPS signals for collecting the latest orbit information and others about the GPS satellites.

Referring now to FIG. 8, the following will describe the procedure of the positioning process of the mobile communication terminal 1 in the connection form as shown in FIG. 7. First, in the mobile communication terminal 1, a positioning request is accepted such as an acquisition request of a content through the use of the application function unit 12a or 12b (step S11), and then the assist data requesting unit 13 of the mobile communication terminal 1 transmits a location information request signal via the base station 2b and radio control device 5 to the switching processing device 6 (step S12).

In response thereto, the switching processing device 6 sends a location information request signal about the mobile communication terminal 1 to the radio control device 5 (step S13). Then the radio control device 5 calculates an estimated location of the mobile communication terminal 1 and an error about the estimated location (step S14). Specifically, the radio control device 5 specifies a located sector where the mobile communication terminal 1 is located, out of sectors formed by the base station 2b, and defines a center position of the located sector as the estimated location. The radio control device 5 can also acquire a round trip time (RTT) from the mobile communication terminal 1 to the base station 2b and define a point distant at a distance corresponding to the RTT from the base station 2b on a center line in the located sector, as the estimated location. Furthermore, the radio control device 5 also calculates an error about the estimated location according to the range of the located sector and the measurement error of RTT.

Thereafter, the radio control device 5 attaches the approximate location information and error information generated corresponding to the estimated location of the mobile communication terminal 1 and the error thereof, to the GPS positioning assist data preliminarily read from the assist data storage device 7 and retained, and transmits the GPS positioning assist data to the assist data requesting unit 13 of the mobile communication terminal 1 (step S15).

Receiving it, the GPS positioning unit 11 of the mobile communication terminal 1 performs the GPS positioning process to acquire more accurate location information of the mobile communication terminal (steps S16 to S18). If the positioning process results in a failure, the mobile communication terminal 1 repeats the processes of steps S12 to S15 according to the error information to acquire the GPS positioning assist data (step S17) and repeats the positioning process (step S18). Furthermore, the application function unit 12a, 12b of the mobile communication terminal 1 transmits a content request signal to the CP server 4, based on the acquired location information, and receives a corresponding content (step S19). As a result, the application function unit 12a or 12b outputs the corresponding content to the output device 39 (step S20). The procedure of the positioning process in steps S16 to S18 is the same as the procedure shown in FIG. 6 and therefore the description thereof is omitted herein.

According to the mobile communication terminal 1 and the GPS positioning method described above, the pieces of the approximate location information indicative of the approximate location of the mobile communication terminal 1 and the error information indicative of the error of the location are received as the GPS positioning assist data, and the GPS positioning is performed using those pieces of information. If the positioning process results in a failure in use of the second positioning method because of a large error of the approximate location information acquired in the visited network in roaming, selection of approximate location information is accepted out of the preset location candidate information and the positioning is again performed using the selected approximate location information. This allows the positioning process to be certainly performed by repeating the positioning process by the first positioning method while refining the approximate location information, even if the positioning by the second positioning method results in a failure because of weak intensities of signals from the GPS satellites.

Since the mobile communication terminal 1 is configured to output the approximate location information as the positioning result with a failure in the GPS positioning in the case where the error corresponding to the used approximate location information is not more than the threshold $TH_L$, it is able to obtain the efficient positioning result by making use of the approximate location information acquired from the outside of the mobile communication terminal 1, as the positioning result. We confirmed that in the mobile communication terminal 1 of the present embodiment the certainty of the normal end of the positioning process was improved from about 0% to about 98% in the case where the error radius of the approximate location information obtained in the visited network in roaming was not less than 1,000 km.

It should be noted that the present invention is by no means limited to the above-described embodiments. For example, in the connection form shown in FIG. 1, the positioning assist server 3 determined the approximate location information and error information and returned the information to the mobile communication terminal 1, but it is also possible to adopt a configuration wherein another facility connected to the communication network NW2 attaches the approximate location information and error information to the GPS positioning assist data returned from the positioning assist server 3.

The input accepting unit 15 of the mobile communication terminal 1 was configured to refer to the candidate information storing unit 16 inside the mobile communication terminal 1 to accept the user's selective input, but the input accepting unit 15 may be configured to download the location candidate information from a database system connected to the communication network NW2 or NW3 or the like and to accept selective input based on the location candidate information from the user.

The procedures of the positioning processes shown in FIGS. 5 and 8 included steps S05-S07 or steps S16-S18 configured so that with a failure in the positioning process, the GPS positioning assist data was again acquired and the positioning process was then repeated, but this may be arranged to repeat the positioning using the GPS positioning assist data previously acquired (in step S04 or S15).

What is claimed is:

1. A mobile communication terminal for receiving positioning assist information and performing GPS positioning using the positioning assist information and signals received from GPS satellites, comprising:

assist information receiving means which receives as the positioning assist information, approximate location information indicative of an approximate location of the mobile communication terminal and error information indicative of an error of the location indicated by the approximate location information;

positioning means which performs the GPS positioning using the positioning assist information;

determining means which determines whether the error information corresponding to the approximate location information used in the GPS positioning is not less than a predetermined value based on a failure in the GPS positioning; and input means which accepts input of the approximate location information when the determining means determines that the error information is not less than the predetermined value, wherein the positioning means again performs positioning using the approximate location information accepted by the input means.

2. The mobile communication terminal according to claim 1, wherein with the failure in the GPS positioning, when the error information is not more than a predetermined value, the determining means performs a control to output the approximate location information as a positioning result.

3. The mobile communication terminal according to claim 1, further comprising candidate information storing means which stores correspondence between location candidate information indicative of candidates for the approximate location information and error information indicative of errors of locations indicated by the location candidate information, wherein the input means accepts selection of one from the location candidate information stored in the candidate information storing means, and wherein the positioning means again performs the positioning, using the location candidate information of the selected one accepted by the input means, and the error information corresponding to the location candidate information.

4. A GPS positioning method for receiving positioning assist information and performing GPS positioning using the positioning assist information and signals received from GPS satellites, comprising:

an assist information receiving step wherein a mobile communication terminal receives as the positioning assist information, approximate location information indicative of an approximate location of the mobile communication terminal and error information indicative of an error of the location indicated by the approximate location information;

a positioning step wherein the mobile communication terminal performs the GPS positioning using the positioning assist information;

a determining step wherein the mobile communication terminal determines whether the error information corresponding to the approximate location information used in the GPS positioning is not less than a predetermined value based on a failure in the GPS positioning; and an input step wherein the mobile communication terminal accepts input of the approximate location information when it is determined in the determining step that the error information is not less than the predetermined value, wherein the positioning step comprises again performing positioning using the approximate location information accepted in the input step.

5. A mobile communication terminal for receiving positioning assist information and performing GPS positioning using the positioning assist information and signals received from GPS satellites, comprising:

a mobile communication module that receives, as the positioning assist information, approximate location information indicative of an approximate location of the mobile communication terminal and error information indicative of an error of the location indicated by the approximate location information;

a GPS positioning module that performs the GPS positioning using the positioning assist information;

a processor that determines, based on a failure in the GPS positioning, whether the error information corresponding to the approximate location information used in the GPS positioning is not less than a predetermined value; and a user interface that receives an input of the approximate location information when the processor determines that the error information is not less than the predetermined value, wherein the GPS positioning module again performs positioning using the approximate location information received at the user interface.

6. The mobile communication terminal according to claim 5, wherein the GPS positioning module performs a first method of GPS positioning using the approximate location information if the error is not less than the predetermined value, and performs a second method of GPS positioning without using the approximate location information if the error is greater than the predetermined value.

7. The mobile communication terminal according to claim 6, wherein the processor, based on a failure in the GPS positioning, instructs the user interface to receive the input of the approximate location information when the error is not less than the predetermined value.

8. The mobile communication terminal according to claim 7, wherein the processor, based on a failure in the GPS positioning, controls a display of the user interface to display a result indicating a failure in the GPS positioning when the error is less than the predetermined value and not less than a second predetermined value, and controls the display of the user interface to output the approximate location information as a positioning result when the error is not more than the second predetermined value.

9. The mobile communication terminal according to claim 8, wherein the predetermined value is greater than the second predetermined value.

* * * * *